United States Patent
Liu et al.

(10) Patent No.: US 11,507,388 B2
(45) Date of Patent: Nov. 22, 2022

(54) STORAGE DEVICE ENUMERATION IN INFORMATION HANDLING SYSTEMS

(71) Applicant: Dell Products L.P., Round Rock, TX (US)

(72) Inventors: Wei Liu, Austin, TX (US); Gobind Vijayakumar, Bangalore (IN); Krishnaprasad Koladi, Karnataka (IN)

(73) Assignee: Dell Products L.P., Round Rock, TX (US)

( * ) Notice: Subject to any disclaimer, the term of this patent is extended or adjusted under 35 U.S.C. 154(b) by 111 days.

(21) Appl. No.: 16/868,193

(22) Filed: May 6, 2020

(65) Prior Publication Data

US 2021/0349732 A1 Nov. 11, 2021

(51) Int. Cl.
*G06F 9/4401* (2018.01)

(52) U.S. Cl.
CPC .................. *G06F 9/4408* (2013.01)

(58) Field of Classification Search
CPC .................................................... G06F 9/4408
See application file for complete search history.

(56) References Cited

U.S. PATENT DOCUMENTS

| | | | | |
|---|---|---|---|---|
| 8,850,174 B1 * | 9/2014 | Mahmoud | ............. | G06F 9/4416 713/2 |
| 2005/0038985 A1 * | 2/2005 | Taylor | ..................... | H04L 67/34 713/2 |
| 2015/0154032 A1 * | 6/2015 | Chen | ..................... | G06F 9/4408 713/2 |
| 2016/0299767 A1 * | 10/2016 | Mukadam | ............... | G06F 3/067 |
| 2016/0350166 A1 * | 12/2016 | Andrews | ............. | G06F 11/0787 |
| 2017/0147361 A1 * | 5/2017 | Kirvan | ................ | G06F 9/44505 |

FOREIGN PATENT DOCUMENTS

| CN | 101499008 A | * | 8/2009 |
|---|---|---|---|
| CN | 108710508 A | * | 10/2018 |

* cited by examiner

*Primary Examiner* — Jaweed A Abbaszadeh
*Assistant Examiner* — Hyun Soo Kim
(74) *Attorney, Agent, or Firm* — McDermott Will & Emery LLP

(57) ABSTRACT

Methods, systems, and computer programs encoded on computer storage medium, for identifying storage devices of an IHS, wherein a BIOS of the IHS is associated with a first enumeration order of the storage devices; enumerating the storage devices such that a particular storage device of the storage devices is enumerated as the first enumerated storage device for both the BIOS and an OS of the IHS, including: determining that an OS installation mode is enabled, and in response, i) exposing only the particular storage device, and ii) disabling the remaining storage devices to; determining that a LUN is set by the BIOS as the first enumerated storage device, including setting an unique identifier (UID) for the particular storage device, and in response fetching data associated with the LUN based on the UID; parsing the LUN data; assigning, based on the parsing, the LUN as the first enumerated storage device.

20 Claims, 7 Drawing Sheets

STORAGE DEVICE ENUMERATION IN INFORMATION HANDLING SYSTEMS

BACKGROUND

Field of the Disclosure

The disclosure relates generally to an information handling system, and in particular, storage device enumeration in the information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Boot optimized devices, although set as the first boot device in the BIOS boot sequence, might not be enumerated as Disk0 in the operating system. As a result, the boot device is not always the default device to install the OS on during OS deployment. This can lead to confusion and potential user errors e.g., deleting the wrong disk contents. Moreover, customers may have scripts/utilities including hard coding of the boot disk as /dev/sda in Linux or Disk0 in Windows, that may be broken as well. This is a result of no direct relationship between the BIOS hard disk enumeration order, and the order in which the operation system numbers the disks (e.g., via Plug and Play (PnP)). The current OS device enumeration algorithms do not give a preference to boot optimized devices (or the storage device set as the first boot device in the boot sequence) explicitly.

SUMMARY

Innovative aspects of the subject matter described in this specification may be embodied in a method including identifying a plurality of storage devices of an information handling system, wherein a basic input/output system (BIOS) of the information handling system is associated with a first enumeration order of the storage devices; enumerating the storage devices such that a particular storage device of the plurality of the storage devices is enumerated as the first enumerated storage device for both the BIOS and an operation system (OS) of the information handling system, including: determining that an OS installation mode provided by the BIOS is enabled; in response to determining that the OS installation mode provided by the BIOS is enabled, i) exposing only the particular storage device to an OS installer computing module, and ii) disabling the remaining storage devices of the plurality of storage devices to the OS installer computing module; determining that a logical unit number (LUN) is set by the BIOS as the first enumerated storage device, including setting an unique identifier (UID) for the particular storage device; in response to determining that that the LUN is set by the BIOS as the first enumerated storage device: fetching, by an OS installer computing module, data associated with the LUN based on the UID; parsing, by the OS installer computing module, the LUN data; and assigning, by the OS installer computing module, based on the parsing, the LUN as the first enumerated storage device for the OS.

Other embodiments of these aspects include corresponding systems, apparatus, and computer programs, configured to perform the actions of the methods, encoded on computer storage devices.

These and other embodiments may each optionally include one or more of the following features. For instance, after exposing the particular storage device to the OS installer computing module, installing, by the OS installer computing module, the OS on the first enumerated storage device. After assigning the LUN as the first enumerated storage device for the OS, installing, by the OS installer computing module, the OS on the first enumerated storage device. The particular storage device is a boot optimized server storage device. After rebooting the information handling system, restoring the remaining storage devices of the plurality of storage devices to the OS installer computing module. After rebooting the information handling system, disabling the OS installation mode provided by the BIOS. Generating, by the BIOS, a runtime variable including the LUN data and the UID; and accessing, by the OS installer computing module, the runtime variable to install the OS on the first enumerated storage device. After determining that the OS installation mode provided by the BIOS is enabled, resetting the information handling system. Generating, by the BIOS, a system management BIOS (SMBIOS) construct including the LUN data and the UID; and Accessing, by the OS installer computing module, the SMBIOS construct to install the OS on the first enumerated storage device.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-8 wherein like numbers are used to indicate like and corresponding parts.

Figure 1:
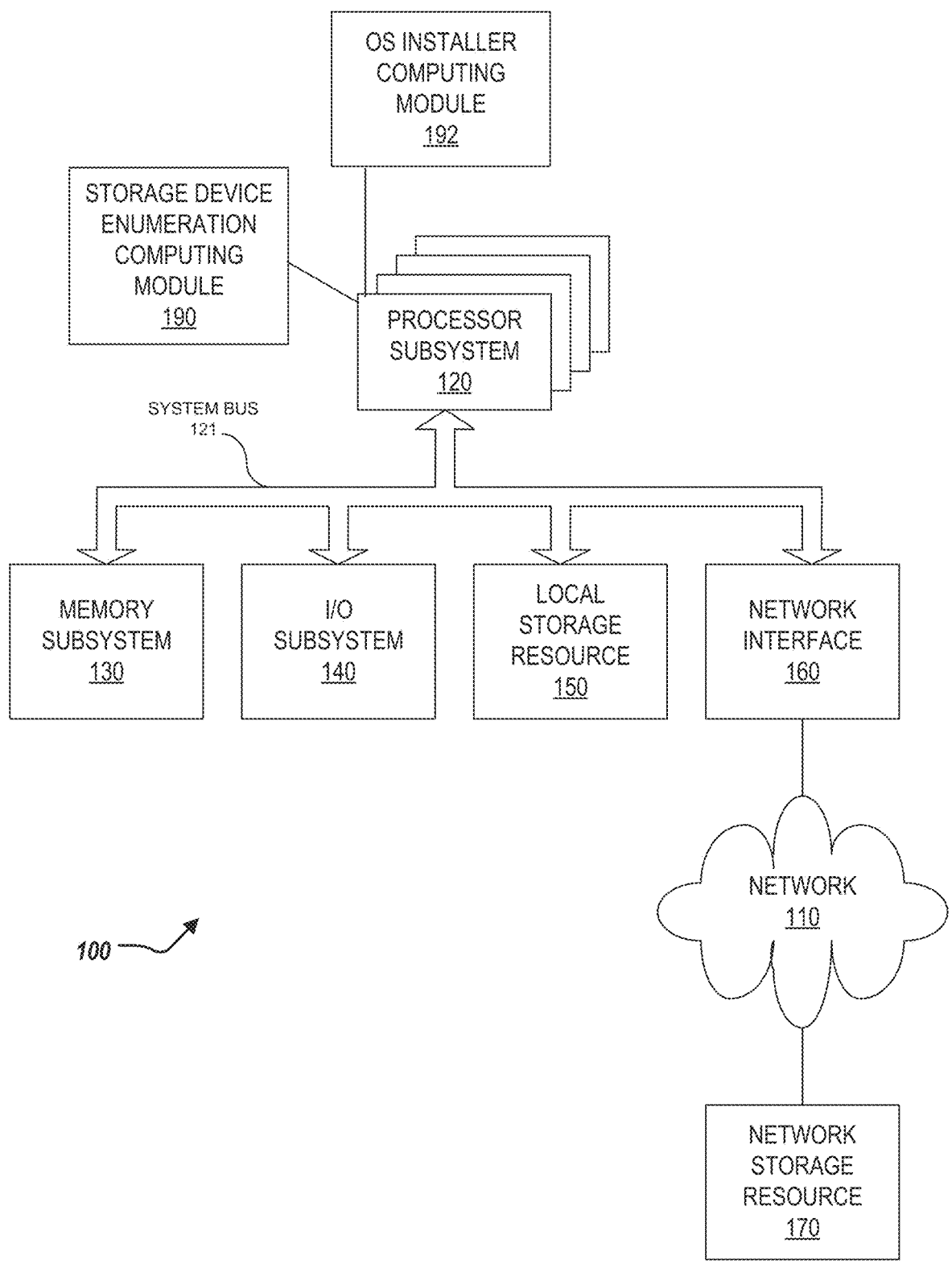
FIG. 1 is a block diagram of selected elements of an embodiment of an information handling system.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can include a storage device enumeration computing module 190 and an OS installer computer module 192. For example, the storage device enumeration computing module 190 and the OS installer computing module 192 can be included by the processor subsystem 120, and/or in communication with the processor subsystem 120. The storage device enumeration computing module 190 and the OS installer computing module 192 are described further herein.

Figure 2:
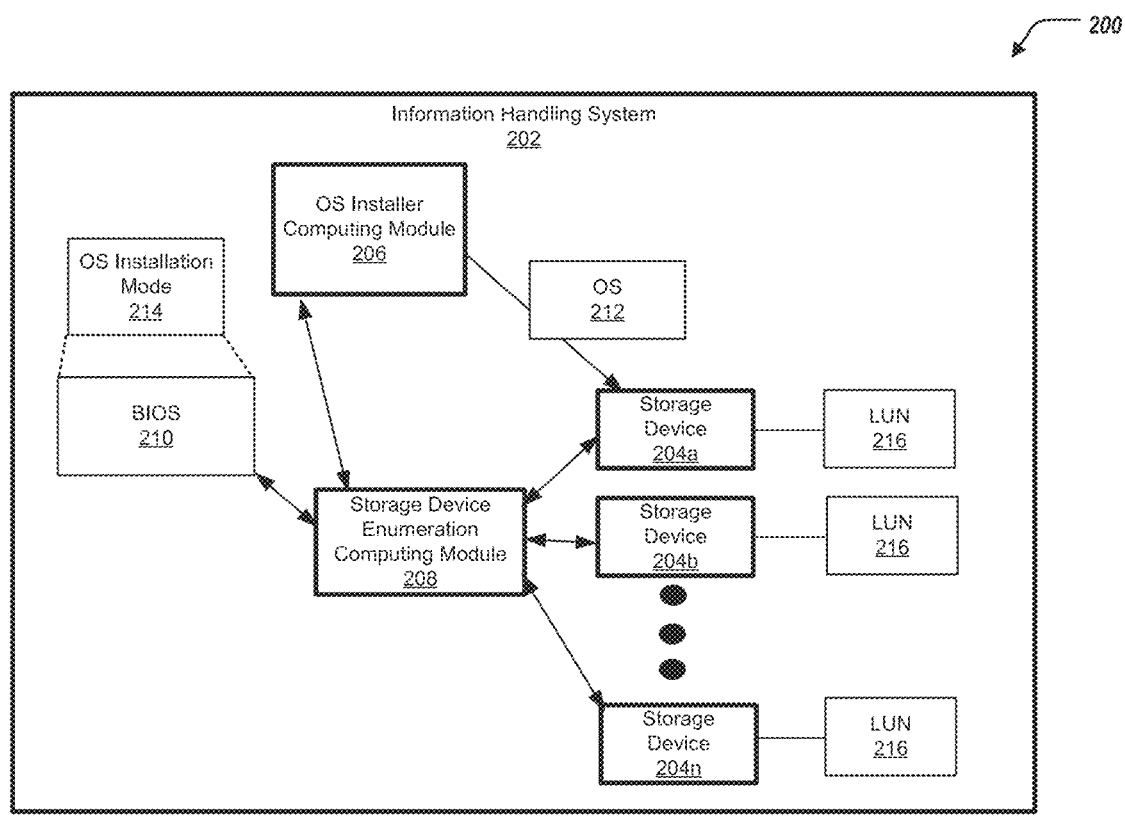
FIG. 2 illustrates a block diagram of the information handling system for storage device enumeration.

Turning to FIG. 2, FIG. 2 illustrates a computing environment 200 including an information handling system 202. The information handling system 202 can include storage devices 204a, 204b, . . . , 204n (collectively referred to as storage devices 204); an operating system (OS) installer computing module 206; a storage device enumeration computing module 208; a basic input/output system (BIOS) computing module 210; and an operating system (OS) module 212. The storage device enumeration computing module 208 can be in communication with the BIOS 210, the OS installer computing module 206, and the storage devices 204. The OS installer computing module 206 can be in communication with the storage devices 204. The information handling system 202 can be similar to the information handling system 100 of FIG. 1. The storage device enumeration computing module 208 can be similar to the storage device enumeration computing module 190 of FIG. 1; and the OS installer computing module 206 can be similar to the OS installer computing module 192 of FIG. 1.

In some examples, the BIOS 210 can be associated with a first enumeration order of the storage devices 204; and the OS 212 can be associated with a second enumeration order of the storage devices 204. In some examples, the first enumeration order and the second enumeration order are different. In some examples, the first enumeration order and the second enumeration order are the same.

To that end, the storage device enumeration computing module 208 can enumerate the storage devices 204. Specifically, the storage device enumeration computing module 208 enumerates the storage devices 204 such that the storage device 204a of the storage devices 204 is enumerated as the first enumerated storage device for both the BIOS module 210 and the OS module 212, described further herein. In some examples, the storage device 204a is a boot optimized server storage (BOSS) device.

In some examples, in short, the storage device enumeration computing module 208 can disable (or hide) each of the remaining storage devices 204b, . . . , 204n (other than the storage device 204a) from the OS installer computing module 206. Thus, only changes are needed to the BIOS 210, making such enumeration of the storage device 204 independent of the OS 212—only the storage device 204a is presented to the OS installer computing module 206, e.g., the BOSS device.

The storage device enumeration computing module 208 can determine that an OS installation mode 214 provided by the BIOS 210 is enabled. The BIOS 210 can provide a set up option for the OS installation mode 214 for the storage device 204a (e.g., the BOSS device) to a user of the information handling system 202. The user can provide user input selecting/enabling the OS installation mode 214 for the storage device 204a. In some examples, the information handling system 202 can provide an intelligent platform management interface (IPMI) command (such as part of an IPMI boot option command) to enable the OS installation mode 214 (e.g., remotely enable the OS installation mode 214).

In some examples, after determining that the OS installation mode 214 provided by the BIOS 210 is enabled, the storage device enumeration computing module 208 can reset the information handling system 202. That is, the storage device enumeration computing module 208 can reset, or power off/on (power cycle), the information handling system 202.

In some implementations, the storage device enumeration computing module 208, in response to determining that the OS installation mode 214 is enabled, exposes only the storage device 204a to the OS installer computing module 206. For example, the storage device enumeration computing module 208, in response to determining that the OS installation module 214 is enabled, exposes only the BOSS device to the OS installer computing module 206. Furthermore, the storage device enumeration computing module 208, in response to determining that the OS installation module 214 is enabled, also disables the remaining storage devices 204b, . . . , 204n to the OS installer computing module 206. For example, the storage device enumeration computing module 208 disables (or hides) all of the remaining storage devices 204 from the OS installer computing module 206, including redundant array of inexpensive disks (RAID) controllers and/or host bus adapter (HBA) of the information handling system 202. As a result, the storage device 204a can be enumerated as the first enumerated storage device.

In some examples, after exposing only the storage device 204a (e.g. the BOSS device) to the OS installer computing module 206, the OS installer computing module 206 installs the OS 212 on the storage device 204a (the first enumerated storage device). That is, the OS installer computing module 206 makes the OS ready for execution by the information handling system 202 by installing the OS 212 on the storage device 204a.

In some examples, the information handling system 202 can be rebooted (power cycled). After the information handling system 202 is rebooted, the remaining storage devices 204 can be restored to the OS installer computing module 206. That is, the remaining storage devices 204 can be re-enabled to their original state, and detectable by the OS installer computing module 206.

In some examples, after the information handling system 202 is rebooted, the OS installation mode 214 is disabled. That is, the OS installation module 214 can be automatically disabled upon rebooting (power cycle) of the information handling system 202.

In some implementations, the storage device enumeration computing module 208 can adjust the BIOS 210 and the OS 212 to facilitate enumeration of the storage devices 204. In short, the storage device enumeration computing module 208 can notify the OS installer computing module 206 of the storage device 204a for enumeration as the first enumerated storage device.

Specifically, the storage device enumeration computing module 208 can determine that a logical unit number (LUN) 216 is set by the BIOS 210 as the first enumerated storage device. The LUN 216 can identify a specific storage device 204, a RAID set of the storage devices 204, or a partition of a storage device 204. The BIOS 210 can provide an option to the user of the information handling system 202 to set the LUN 216 which the OS 212 sets as the first enumerated storage device. In some examples, when specifying the LUN 216, an unique identifier (UID) is set for the first enumerated storage device. For example, the UID is set for the BOSS device, with the details/data associated with the LUN 216 attached to the UID. For example, an example format for the logical device UID can be '<Unique Label>::PCI ID of the device:: <device>:Controller:Target:LUN'.

The storage device enumeration computing module 208, in response to determining that the LUN 216 is set by the BIOS 210 as the first enumerated storage device, can take the following actions. Specifically, the BIOS 210 can provide the first enumerated storage device and the data associated with the LUN 216 to the OS installer computing module 206. For example, using an advanced configuration and power interface (ACPI), the BIOS 210 provides device identification objects, including the UID, to the OS installer computing module 206. The OS installer computing module 206 can fetch the data associated with the LUN 216 based on the UID. Specifically, the OS installer computing module 206, after reading all the available storage device 204, reads the UID for the storage device 204a (e.g., the BOSS device), reads the UID unique label, and fetches the peripheral component interconnect (PCI) identifier (ID) and LUN data. The OS installer computing module 206 parses the LUN data. Specifically, the OS installer computing module 206 parses the LUN data using the Controller:Target:LUN data provided via the ACPI. The OS installer computing module 206 assigns, based on the parsing, the LUN 216 as the first enumerated storage device for the OS 212. That is, the OS installer computing module 206 assigns the specific LUN 216 as the first enumerated storage device (e.g., /dev/sda for SCSI devices in Linux). In some examples, after assigning the LUN 216 as the first enumerated storage device for the OS 212, the OS installer computing module 206 installs the OS 212 on the first enumerated storage device (the LUN 216). That is, the OS installer computing module 206 makes the OS ready for execution by the information handling system 202 by installing the OS 212 on the first enumerated storage device (the LUN 216).

Figure 5:
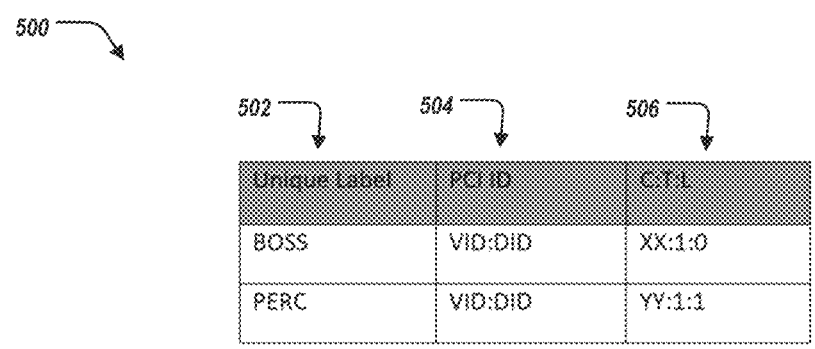
FIG. 5 illustrates a table for storage device enumeration in the information handling system.

FIG. 5 illustrates an example table 500 for the UID for each of the storage devices 204. The table 500 can include, for each storage device 204, the UID 502, the PCI ID 504, and C:T:L 506.

In some examples, the BIOS 210 can generate a runtime variable including the LUN data and the UID. For example, the runtime variable can be an unified extensible firmware interface (UEFI) variable that is provided by the BIOS 210. The OS installer computing module 206 can access the runtime variable to install the OS 212 on the first enumerated storage device. For example, the OS installer computing module 214 can access the UEFI runtime variable during installation of the OS 212 on the first enumerated storage device, or after installation of the OS 212 on the first enumerated storage device. For example, a Linux OS can obtain the UEFI variable via sysfs.

In some examples, the BIOS can generate a system management BIOS (SMBIOS) construct including the LUN data and the UID. The OS installer computing module 206 can access the SMBIOS construct to install the OS 212 on the first enumerated storage device.

Figure 3:
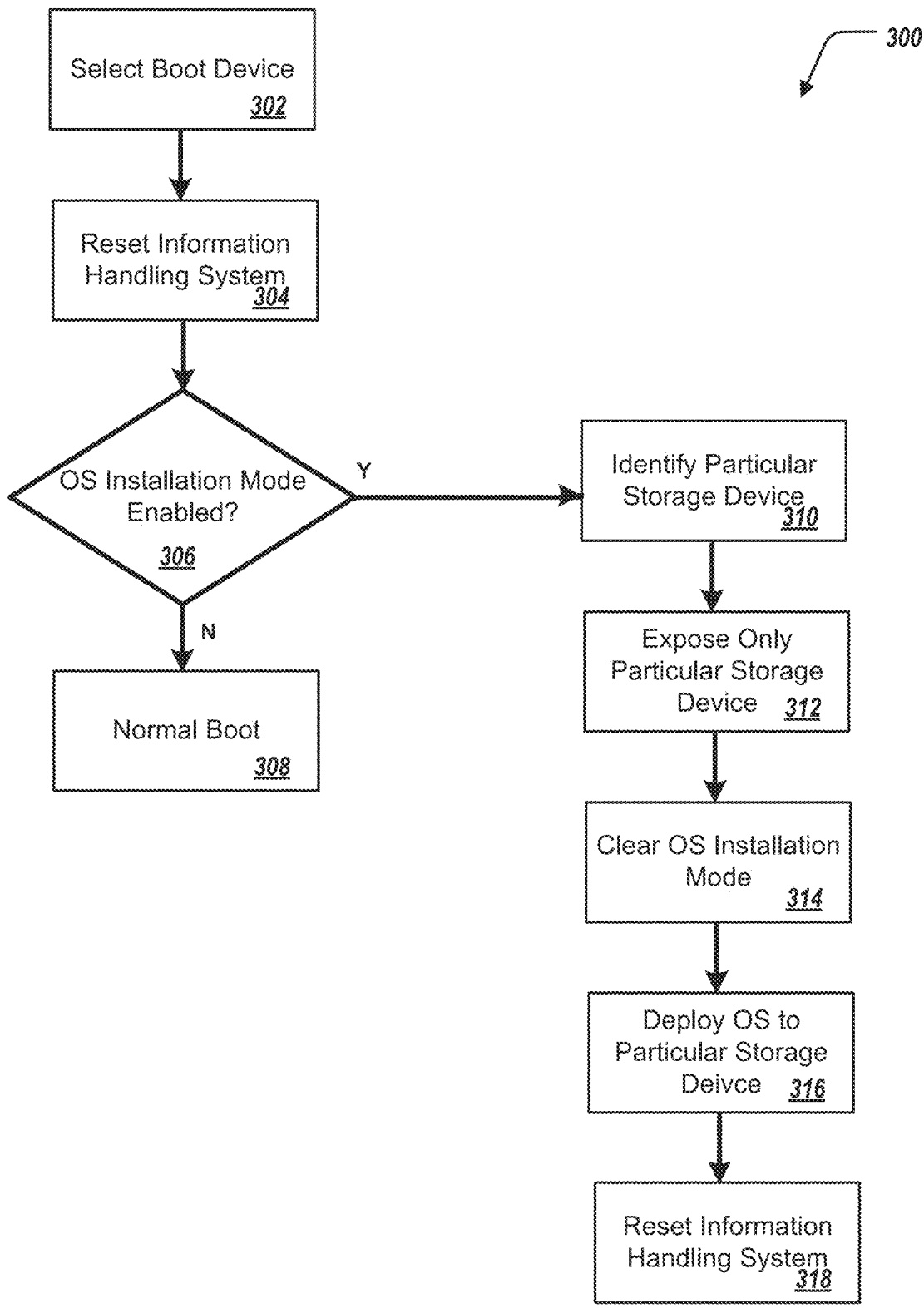
FIGS. 3, 4, 6, 7, and 8 illustrate respective methods for storage device enumeration in the information handling system.

FIG. 3 illustrates a flowchart depicting selected elements of an embodiment of a method 300 for storage device enumeration in the information handling system 202. The method 300 may be performed by the information handling system 100, the computing environment 200, the information handling system 202, the OS installer computing module 206, and/or the storage device enumeration computing module 208 with reference to FIGS. 1, 2, and 5. It is noted that certain operations described in method 300 may be optional or may be rearranged in different embodiments.

A user selects the storage device 204a (the boot device, or BOSS device) via the OS installation mode 214 of the BIOS 210 (302). The information handling system 202 resets (304). The storage device enumeration computing module 208 determines whether the OS installation mode 214 is enabled (306). When the storage device enumeration computing module 208 determines that the OS installation mode 214 is not enabled, the information handling system 202 performs a normal boot (308). When the storage device enumeration computing module 208 determines that the OS installation mode 214 is enabled, the storage device enumeration computing module 208 identifies which storage device 204 is selected as the first enumerated storage device (310). The storage device enumeration computing module 208 exposes only the storage device 204a to the OS installer computing module 206, and disables the remaining storage devices 204 to the OS installer computing module 206 (312). The storage device enumeration computing module 208 clears the OS installation mode 214 (314). The OS installer computing module 206 detects the first enumerated storage device 204 and deploys the OS 212 to the first enumerated storage device 204 (316). The information handling system 202 is reset (318).

Figure 4:
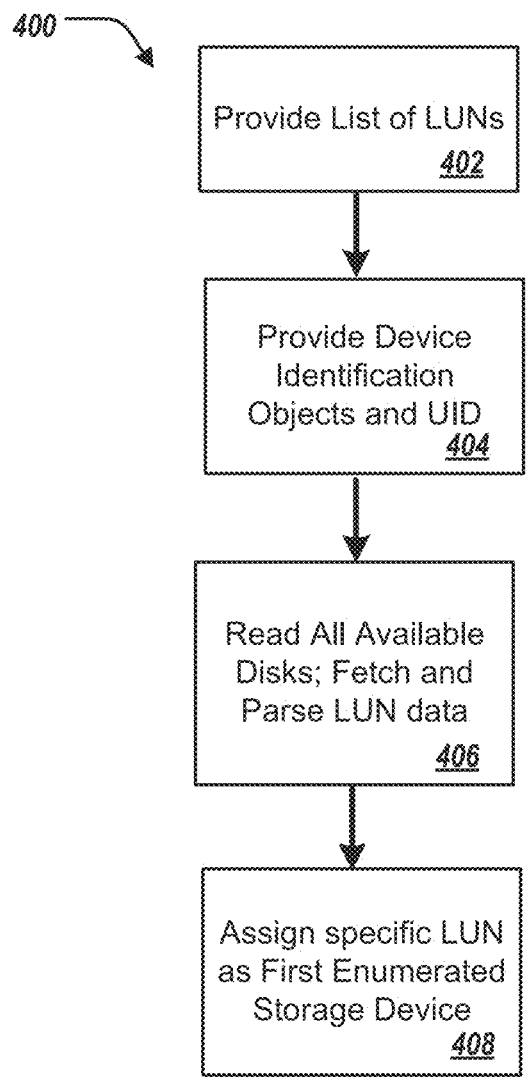

FIG. 4 illustrates a flowchart depicting selected elements of an embodiment of a method 400 for storage device enumeration in the information handling system 202. The method 400 may be performed by the information handling system 100, the computing environment 200, the information handling system 202, the OS installer computing module 206, and/or the storage device enumeration computing module 208 with reference to FIGS. 1, 2, and 5. It is noted that certain operations described in method 400 may be optional or may be rearranged in different embodiments.

The BIOS 210 provides a list of LUNs present in the information handling system 202 (402). The BIOS 210, using ACPI, provides device identification objects, including the UID, to the OS installer computing module 206 (404). The OS installer computing module 206 reads all available storage devices 204, fetches and parses the LUN data associated with the UID (406). The OS installer computing module 206 assigns the specific LUN associated with the UID as the first enumerated storage device (e.g., as Disk 0/sda) (408).

Figure 6:
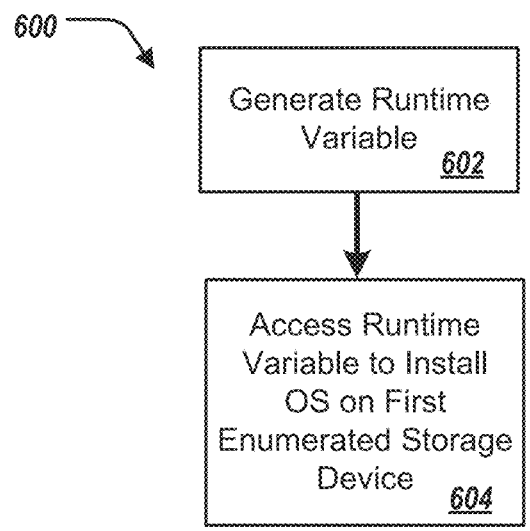

FIG. 6 illustrates a flowchart depicting selected elements of an embodiment of a method 600 for storage device enumeration in the information handling system 202. The method 600 may be performed by the information handling system 100, the computing environment 200, the information handling system 202, the OS installer computing module 206, and/or the storage device enumeration computing module 208 with reference to FIGS. 1, 2, and 5. It is noted that certain operations described in method 600 may be optional or may be rearranged in different embodiments.

The BIOS 210 can generate a runtime variable including the LUN data and the UID (602). The OS installer computing module 206 can access the runtime variable to install the OS 212 on the first enumerated storage device 204 (604).

Figure 7:
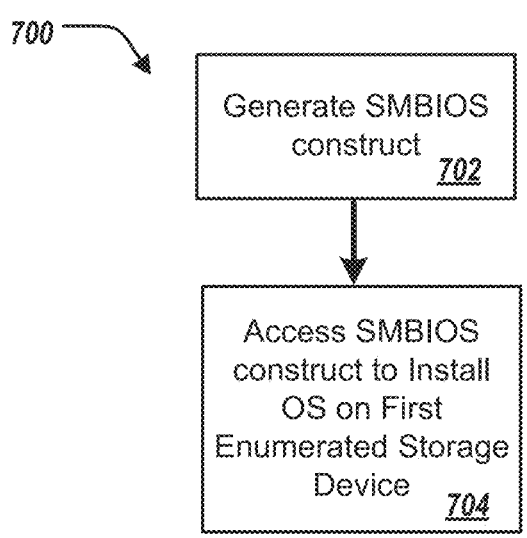

FIG. 7 illustrates a flowchart depicting selected elements of an embodiment of a method 700 for storage device enumeration in the information handling system 202. The method 600 may be performed by the information handling system 100, the computing environment 200, the information handling system 202, the OS installer computing module 206, and/or the storage device enumeration computing module 208 with reference to FIGS. 1, 2, and 5. It is noted that certain operations described in method 700 may be optional or may be rearranged in different embodiments.

The BIOS can generate a system management BIOS (SMBIOS) construct including the LUN data and the UID (702). The OS installer computing module 206 can access the SMBIOS construct to install the OS 212 on the first enumerated storage device 204 (704).

Figure 8:
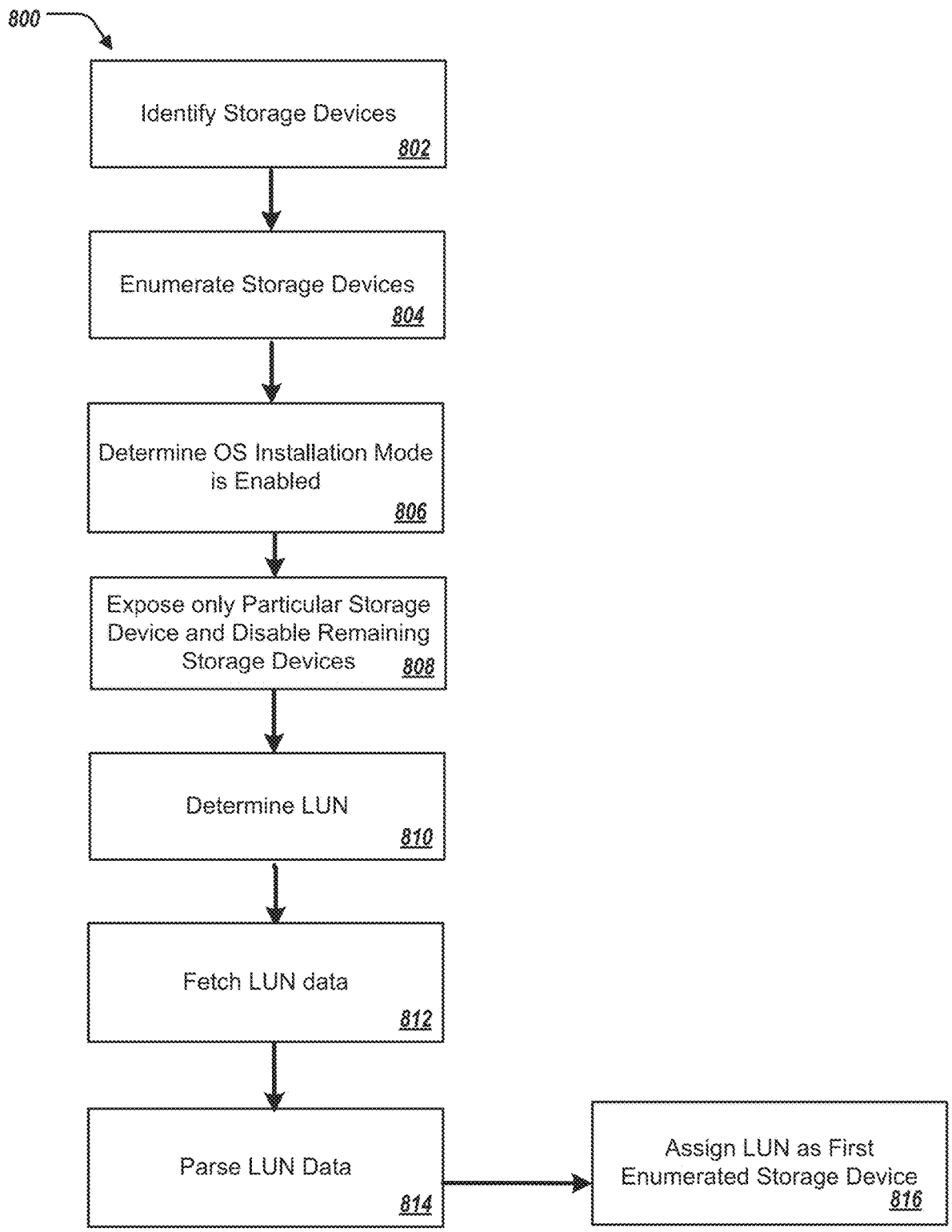

FIG. 8 illustrates a flowchart depicting selected elements of an embodiment of a method 800 for storage device enumeration in the information handling system 202. The method 800 may be performed by the information handling system 100, the computing environment 200, the information handling system 202, the OS installer computing module 206, and/or the storage device enumeration computing module 208 with reference to FIGS. 1, 2, and 5. It is noted that certain operations described in method 800 may be optional or may be rearranged in different embodiments.

The storage device enumeration computing module 208 identifies the plurality of storage devices 204 of the information handling system 202 (802). In some examples, the BIOS 210 of the information handling system 202 is associated with a first enumeration order of the storage devices 204. The storage device enumeration computing module 208 enumerates the storage devices 204 such that a storage device 204a of the plurality of storage devices 204 is enumerated as the first enumerated storage device for both the BIOS 210 and an operation system (OS) 212 of the information handling system 202 (804). The storage device enumeration computing module 208 determines that that an OS installation mode 214 provided by the BIOS 210 is enabled (806). The storage device enumeration computing module 208, in response to determining that the OS installation mode 214 provided by the BIOS 210 is enabled, i) exposes only the storage device 204a to an OS installer computing module 206, and ii) disables the remaining storage devices 204 to the OS installer computing module 206 (808). The storage device enumeration computing module 208 determines that a logical unit number (LUN) 216 is set by the BIOS 210 as the first enumerated storage device (810). In some examples, the storage device enumeration computing module 208 sets an unique identifier (UID) for the storage device 204a. In response to determining that that the logical unit number (LUN) 216 is set by the BIOS 210 as the first enumerated storage device 204, the OS installer computing module 206 fetches data associated with the LUN 216 based on the UID (812). Further, the OS installer computing module 206 parses the LUN data (814). Further, the OS installer computing module 206 assigns, based on the parsing, the LUN 216 as the first enumerated storage device for the OS 212 (816). The OS installer computing module 206 installs the OS 212 on the first enumerated storage device 204a.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method, including:
identifying a plurality of storage devices of an information handling system, wherein a basic input/output system (BIOS) of the information handling system is associated with a first enumeration order of the storage devices, and an operating system (OS) of the information handling system is associated with a second enumeration order of the storage devices, wherein the first enumeration order and the second enumeration order are different;
enumerating the storage devices such that a particular storage device of the plurality of the storage devices is enumerated as the first enumerated storage device for both the BIOS and the OS of the information handling system based on the first enumeration order of the BIOS, wherein the first enumerated storage device is a partition of the particular storage device and identified as disk0, including:
determining that an OS installation mode provided by the BIOS is enabled;
in response to determining that the OS installation mode provided by the BIOS is enabled, i) exposing only the particular storage device, that is the first enumerated storage device based on the first enumeration order of the BIOS, to an OS installer computing module, and ii) disabling the remaining storage devices of the plurality of storage devices to the OS installer computing module;
determining that a logical unit number (LUN) is set by the BIOS as the first enumerated storage device, including setting a unique identifier (UID) for the particular storage device;
in response to determining that the LUN is set by the BIOS as the first enumerated storage device:
fetching, by an OS installer computing module, data associated with the LUN based on the UID;
parsing, by the OS installer computing module, the LUN data; and
assigning, by the OS installer computing module, based on the parsing, the LUN as the first enumerated storage device for the OS.

2. The computer-implemented method of claim 1, further comprising after exposing the particular storage device to the OS installer computing module, installing, by the OS installer computing module, the OS on the first enumerated storage device.

3. The computer-implemented method of claim 1, further comprising after assigning the LUN as the first enumerated storage device for the OS, installing, by the OS installer computing module, the OS on the first enumerated storage device.

4. The computer-implemented method of claim 1, wherein the particular storage device is a boot optimized server storage device.

5. The computer-implemented method of claim 1, after rebooting the information handling system, restoring the remaining storage devices of the plurality of storage devices to the OS installer computing module.

6. The computer-implemented method of claim 1, after rebooting the information handling system, disabling the OS installation mode provided by the BIOS.

7. The computer-implemented method of claim 1, further comprising:
generating, by the BIOS, a runtime variable including the LUN data and the UID; and
accessing, by the OS installer computing module, the runtime variable to install the OS on the first enumerated storage device.

8. The computer-implemented method of claim 1, further comprising after determining that the OS installation mode provided by the BIOS is enabled, resetting the information handling system.

9. The computer-implemented method of claim 1, further comprising:
generating, by the BIOS, a system management BIOS (SMBIOS) construct including the LUN data and the UID; and
accessing, by the OS installer computing module, the SMBIOS construct to install the OS on the first enumerated storage device.

10. An information handling system, comprising:
a memory media storing instructions;
a processor in communication with the memory media to execute the instructions to perform operations comprising:
identifying a plurality of storage devices of an information handling system, wherein a basic input/output system (BIOS) of the information handling system is associated with a first enumeration order of the storage devices, and an operating system (OS) of the information handling system is associated with a second enumeration order of the storage devices, wherein the first enumeration order and the second enumeration order are different;
enumerating the storage devices such that a particular storage device of the plurality of the storage devices is enumerated as the first enumerated storage device for both the BIOS and the OS of the information handling system based on the first enumeration order of the BIOS, wherein the first enumerated storage device is a partition of the particular storage device and identified as disk0, including:
determining that an OS installation mode provided by the BIOS is enabled;
in response to determining that the OS installation mode provided by the BIOS is enabled, i) exposing only the particular storage device, that is the first enumerated storage device based on the first enumeration order of the BIOS, to an OS installer computing module, and ii) disabling the remaining storage devices of the plurality of storage devices to the OS installer computing module;
determining that a logical unit number (LUN) is set by the BIOS as the first enumerated storage device, including setting a unique identifier (UID) for the particular storage device;
in response to determining that the LUN is set by the BIOS as the first enumerated storage device:
fetching, by an OS installer computing module, data associated with the LUN based on the UID;
parsing, by the OS installer computing module, the LUN data; and
assigning, by the OS installer computing module, based on the parsing, the LUN as the first enumerated storage device for the OS.

11. The information handling system of claim 10, the operations further comprising after exposing the particular storage device to the OS installer computing module, installing, by the OS installer computing module, the OS on the first enumerated storage device.

12. The information handling system of claim 10, the operations further comprising after assigning the LUN as the first enumerated storage device for the OS, installing, by the OS installer computing module, the OS on the first enumerated storage device.

13. The information handling system of claim 10, wherein the particular storage device is a boot optimized server storage device.

14. The information handling system of claim 10, the operations further after rebooting the information handling system, restoring the remaining storage devices of the plurality of storage devices to the OS installer computing module.

15. The information handling system of claim 10, the operations further after rebooting the information handling system, disabling the OS installation mode provided by the BIOS.

16. The information handling system of claim 10, the operations further comprising:
   generating, by the BIOS, a runtime variable including the LUN data and the UID; and
   accessing, by the OS installer computing module, the runtime variable to install the OS on the first enumerated storage device.

17. The information handling system of claim 10, the operations further comprising after determining that the OS installation mode provided by the BIOS is enabled, resetting the information handling system.

18. The information handling system of claim 10, the operations further comprising:
   generating, by the BIOS, a system management BIOS (SMBIOS) construct including the LUN data and the UID; and
   accessing, by the OS installer computing module, the SMBIOS construct to install the OS on the first enumerated storage device.

19. A non-transitory computer-readable medium storing software comprising instructions executable by one or more computers which, upon such execution, cause the one or more computers to perform operations comprising:
   identifying a plurality of storage devices of an information handling system, wherein a basic input/output system (BIOS) of the information handling system is associated with a first enumeration order of the storage devices, and an operating system (OS) of the information handling system is associated with a second enumeration order of the storage devices, wherein the first enumeration order and the second enumeration order are different;
   enumerating the storage devices such that a particular storage device of the plurality of the storage devices is enumerated as the first enumerated storage device for both the BIOS and the OS of the information handling system based on the first enumeration order of the BIOS, wherein the first enumerated storage device is a partition of the particular storage device and identified as disk0, including:
      determining that an OS installation mode provided by the BIOS is enabled;
      in response to determining that the OS installation mode provided by the BIOS is enabled, i) exposing only the particular storage device, that is the first enumerated storage device based on the first enumeration order of the BIOS, to an OS installer computing module, and ii) disabling the remaining storage devices of the plurality of storage devices to the OS installer computing module;
      determining that a logical unit number (LUN) is set by the BIOS as the first enumerated storage device, including setting a unique identifier (UID) for the particular storage device;
      in response to determining that the LUN is set by the BIOS as the first enumerated storage device:
         fetching, by an OS installer computing module, data associated with the LUN based on the UID;
         parsing, by the OS installer computing module, the LUN data; and
         assigning, by the OS installer computing module, based on the parsing, the LUN as the first enumerated storage device for the OS.

20. The computer readable medium of claim 19, the operations further comprising after exposing the particular storage device to the OS installer computing module, installing, by the OS installer computing module, the OS on the first enumerated storage device.

* * * * *